(12) United States Patent
De Smet

(10) Patent No.: US 11,461,345 B2
(45) Date of Patent: Oct. 4, 2022

(54) PROVIDING ACCESS TO STATE INFORMATION ASSOCIATED WITH OPERATORS IN A DATA PROCESSING SYSTEM

(71) Applicant: Microsoft Technology Licensing, LLC, Redmond, WA (US)

(72) Inventor: Bart J. F. De Smet, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 211 days.

(21) Appl. No.: 16/428,749

(22) Filed: May 31, 2019

(65) Prior Publication Data
US 2020/0379992 A1    Dec. 3, 2020

(51) Int. Cl.
| | |
|---|---|
| *G06F 16/901* | (2019.01) |
| *G06F 16/242* | (2019.01) |
| *G06F 16/28* | (2019.01) |
| *G06F 16/00* | (2019.01) |
| *G06F 16/2458* | (2019.01) |
| *G06F 16/248* | (2019.01) |

(52) U.S. Cl.
CPC ........ *G06F 16/2477* (2019.01); *G06F 16/248* (2019.01); *G06F 16/28* (2019.01); *G06F 16/9024* (2019.01); *G06F 16/2445* (2019.01); *G06F 16/2448* (2019.01)

(58) Field of Classification Search
CPC ................ G06F 16/00; G06F 16/9024; G06F 16/2448; G06F 16/248; G06F 16/2477; G06F 16/28; G06F 16/2445
USPC ................................................. 707/609, 722
See application file for complete search history.

(56) References Cited

U.S. PATENT DOCUMENTS

| | | | |
|---|---|---|---|
| 2002/0064267 A1* | 5/2002 | Martin ................. | H04Q 3/0054 379/207.02 |
| 2009/0113394 A1* | 4/2009 | Weber ....................... | G06F 8/10 717/126 |
| 2014/0172914 A1* | 6/2014 | Elnikety ............. | G06F 16/9024 |

(Continued)

OTHER PUBLICATIONS

"International Search Report and Written Opinion Issued in PCT Application No. PCT/US20/028891", dated Jul. 27, 2020, 13 Pages.

*Primary Examiner* — Kuen S Lu
(74) *Attorney, Agent, or Firm* — Ray Quinney & Nebeker P.C; James Bullough

(57) ABSTRACT

A data processing system that provides access to operator state information includes a plurality of operators that are configured to perform a computation with respect to data received from data sources. State information is associated with at least one of the plurality of operators. The data processing system also includes an object graph that comprises a representation of the computation, and that may dynamically change at runtime. The data processing system also includes an interface that provides access to the state information via the object graph. The data processing system also includes a query manager that is executable to process a graph query to retrieve the state information by traversing a plurality of nodes within the object graph. Temporal navigation is also supported. Thus, processing a graph query may involve navigating to a node in the object graph at a certain point in time.

19 Claims, 9 Drawing Sheets

(56) References Cited

U.S. PATENT DOCUMENTS

| | | | |
|---|---|---|---|
| 2015/0286684 A1* | 10/2015 | Heinz | G06F 16/2452 |
| | | | 707/769 |
| 2016/0063080 A1* | 3/2016 | Nano | G06F 16/254 |
| | | | 707/602 |
| 2017/0116210 A1* | 4/2017 | Park | G06F 9/542 |
| 2018/0367557 A1* | 12/2018 | Brown | H04L 63/145 |
| 2019/0114302 A1* | 4/2019 | Bequet | H04L 67/10 |

* cited by examiner

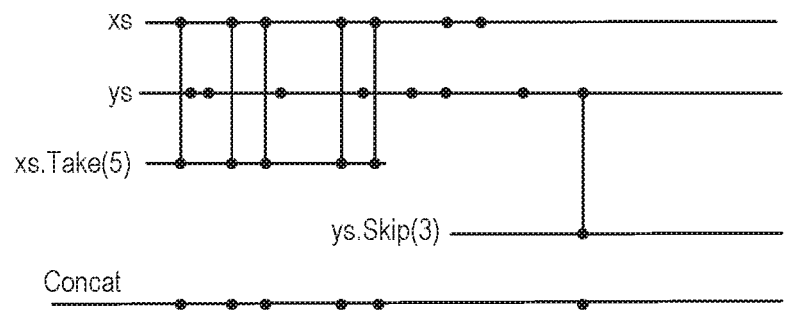
FIG. 5A
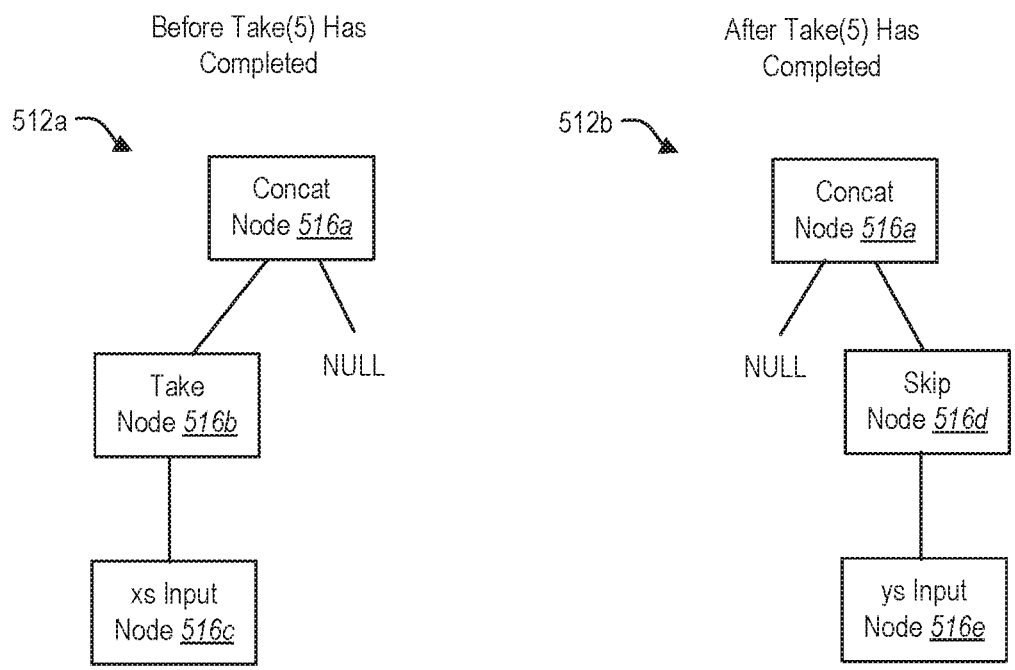
FIG. 5B
FIG. 5C

PROVIDING ACCESS TO STATE INFORMATION ASSOCIATED WITH OPERATORS IN A DATA PROCESSING SYSTEM

CROSS-REFERENCE TO RELATED APPLICATIONS

N/A

BACKGROUND

In general terms, data processing refers to the collection and manipulation of items of data to produce meaningful information. A data processing system includes operators that perform computations on data received from one or more data sources, thereby producing one or more outputs.

One example of a data processing system is an event processing system. Event processing (which may also be referred to as event stream processing) involves quickly analyzing time-based data, such as time series data. In the context of event processing, the term "event" refers to any occurrence that happens at a defined time and can be recorded using one or more data fields. With traditional approaches, data is typically processed after it has been stored. Advantageously, event processing allows data to be analyzed as it is being created and before it is stored in a non-volatile medium. For example, data may be analyzed when it is streaming from one device to another. This allows for faster reaction time and may even provide an opportunity for proactive measures to be taken. Event processing may be utilized to identify meaningful patterns or relationships within event streams in order to detect relationships like event correlation, causality, or timing.

Operators in data processing systems, such as event processing systems, may contain information that is useful to be observed or accessed by users. This information may be referred to as state information. However, the state information that is associated with operators is often not accessible. As an example, consider an "Average" operator (i.e., an operator that computes the average of a set of values). The state information that is associated with this type of operator may include (i) the sum of the set of values, and (ii) the count of the set of values (i.e., how many values there are in the set). Even though the sum and the count may be useful under some circumstances, the "Average" operator may be configured so that the sum and the count are not accessible and only the average is provided as an output.

In an event processing system with a temporal ordering of values, intermediate values of operators can provide meaningful information. In other words, even though an operator may be designed to return a value when a sequence ends (or upon the occurrence of a designated event, e.g., the closing of a "window" over a temporal range), intermediate values that are produced during the computation before the end of the sequence (or before the occurrence of the designated event) may themselves include meaningful information. For example, suppose that an "Average" operator is designed to return the average of a set of input values when the sequence of input values ends. Even though in this example the "Average" operator would return the average of the input values at the time the sequence ends (e.g., 3:00 p.m.), the "Average" operator also produces meaningful information prior to the end of the sequence. For example, the average of the input values at one or more earlier points in time before the sequence ends (e.g., 2:00 p.m., 2:05 p.m.) would also be meaningful and potentially useful. The average at 2:00 p.m. summarizes all events that predate 2:00 p.m., the average at 2:05 p.m. summarizes all events that predate 2:05 p.m., and so forth. Thus, in an event processing system there is even more opportunity to extract meaningful information from operators than in a traditional data processing system.

The state information in an event processing system may be temporal in nature, and there may be a causal relationship between the state information and the inputs of the computation. The temporal dimension of such data makes it challenging to address state information in an event processing system.

To determine state information, computations may be annotated with explicit operations related to writing state information to memory. However, such an approach has limited value because it requires the operator state to be duplicated. In other words, such an approach requires an internal memory allocation that is owned by the computation itself, and explicitly created memory allocation to hold copies of the operator state. This type of approach has the advantage of being explicitly expressed in the computational intent, but it can lead to problems such as obscure coding patterns, much increased input/output cost, etc. Furthermore, some operator state information is well-encapsulated and alternative operators are needed to provide some form of access in order for the user to be able to "chain in" explicit operations related to writing state information to memory. An example is a "Sum" aggregation operator in a reactive computation. While it holds the running sum internally, it doesn't provide (or "leak") intermediate values out to the user. As such, variants of such operators have to be used to "leak" computational state. For example, an operator that provides each intermediate value (e.g., a "Scan" operator) may be used rather than an operator that only provides the final value (e.g., an "Aggregate" operator).

Debuggers typically have the capability to inspect state information associated with operators. However, the use of debuggers to access operator state information is not appropriate for most scenarios in which the state information would be useful. For example, it is typically desirable to be able to access operator state information without having to pause the computation(s) being performed by the operator(s). Debuggers, however, are typically used offline (i.e., they require computations to be paused). In addition, debuggers do not enforce an internal organization of state that has to be kept stable. In other words, the state information is an implementation detail of operators that can change at any time.

SUMMARY

In accordance with one aspect of the present disclosure, a data processing system is disclosed. The data processing system is configured to provide access to operator state information. The data processing system includes a plurality of operators that are executable by one or more processors to perform a computation with respect to data received from data sources. State information may be associated with at least one of the plurality of operators. The computation may produce at least one output, and the state information may not be included in the at least one output. The data processing system also includes an interface that provides access to the state information, and a query manager that is executable by the one or more processors to process a query to retrieve the state information via the interface.

The data processing system may include an event processing system. The computation may be performed with respect to events produced by a plurality of event sources, each event being associated with a timestamp.

The data processing system may further include an object graph that includes a representation of the computation. The interface may provide access to the state information via the object graph.

The plurality of operators may be configured to store the state information for a plurality of different points in time. The query may specify a temporal constraint. The state information may include a temporal dimension.

The computation may change dynamically such that the computation involves a first set of one or more operators at a first point in time and a second set of one or more operators at a second point in time. The interface may provide access to the state information via an object graph. The object graph may also change dynamically such that the object graph comprises a first set of one or more nodes corresponding to the first set of one or more operators at the first point in time and a second set of one or more nodes corresponding to the second set of one or more operators at the second point in time.

The query may include a reference to a previous point in time. The data processing system may further include a data store, a plurality of system checkpoints stored in the data store, events stored in the data store, and a state information manager. The state information manager may be executable by the one or more processors to determine the state information corresponding to the previous point in time using a system checkpoint and subsequent events that have a timestamp after the system checkpoint and not later than the previous point in time specified by the query.

The data processing system may further include a configuration manager that configures the plurality of operators to store the state information for a time period that exceeds a defined failover time period.

The interface may provide access to the state information via an object graph. The plurality of nodes in the object graph may correspond to the plurality of operators.

In accordance with another aspect of the present disclosure, a method is disclosed for providing access to state information associated with an operator within a data processing system. The method may include receiving, from a querying entity, a graph query to determine the state information associated with the operator. The method may also include processing the graph query to determine the state information. Processing the graph query may include accessing an object graph via an interface that is defined for the data processing system and traversing a plurality of nodes within the object graph. The object graph may represent a computation that includes the operator. The method may also include returning the state information to the querying entity.

The data processing system may include an event processing system. The computation may be performed with respect to events produced by at least one event source, each event being associated with a timestamp.

The method may further include navigating to a node within the object graph, selecting a property of the node, and creating an event processing query with respect to the property of the node.

The computation may change dynamically such that the computation involves a first set of one or more operators at a first point in time and a second set of one or more operators at a second point in time. The object graph may also change dynamically such that the object graph may include a first set of one or more nodes corresponding to the first set of one or more operators at the first point in time and a second set of one or more nodes corresponding to the second set of one or more operators at the second point in time.

The operator may store the state information for a plurality of different points in time. The graph query may specify a temporal constraint. The state information may include a temporal dimension.

The method may further include receiving user input that specifies a time period for storing the state information and configuring the operator to store the state information for the specified time period.

The method may further include configuring the operator to store the state information for a time period that exceeds a defined failover time period.

The method may further include storing events and storing a system checkpoint that includes the state information at a first point in time. The graph query may request the state information at a second point in time that occurs after the first point in time. Processing the graph query may include accessing the system checkpoint and replaying the events that have timestamps that are subsequent to the first point in time but not later than the second point in time.

The computation may be performed in response to a query. The method may further include using the state information to optimize the query.

In accordance with another aspect of the present disclosure, a method is disclosed for accessing state information associated with an operator within a data processing system. The method includes creating a first graph query that includes a request to determine the state information associated with the operator by traversing a plurality of nodes in an object graph. The object graph may represent a computation that includes the operator. The operator may be represented as a node in the object graph. The state information may be represented as a property of the node. The method may also include receiving the state information from the query manager.

The data processing system may include an event processing system. The computation may be performed with respect to events produced by at least one event source, each event being associated with a timestamp.

The computation may produce at least one output. The state information may be used to generate the at least one output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIG. 5A illustrates an example showing how a dynamically changing query involving a Take operator, a Skip operator, and a Concat operator may be implemented.

FIG. 5B illustrates an example of an object graph that represents the computation that is expressed in the query shown in FIG. 5A at a point in time before the Take operator has completed.

FIG. 5C illustrates an example of an object graph that represents the computation that is expressed in the query shown in FIG. 5A at a point in time after the Take operator has completed.

DETAILED DESCRIPTION

Figure 1:
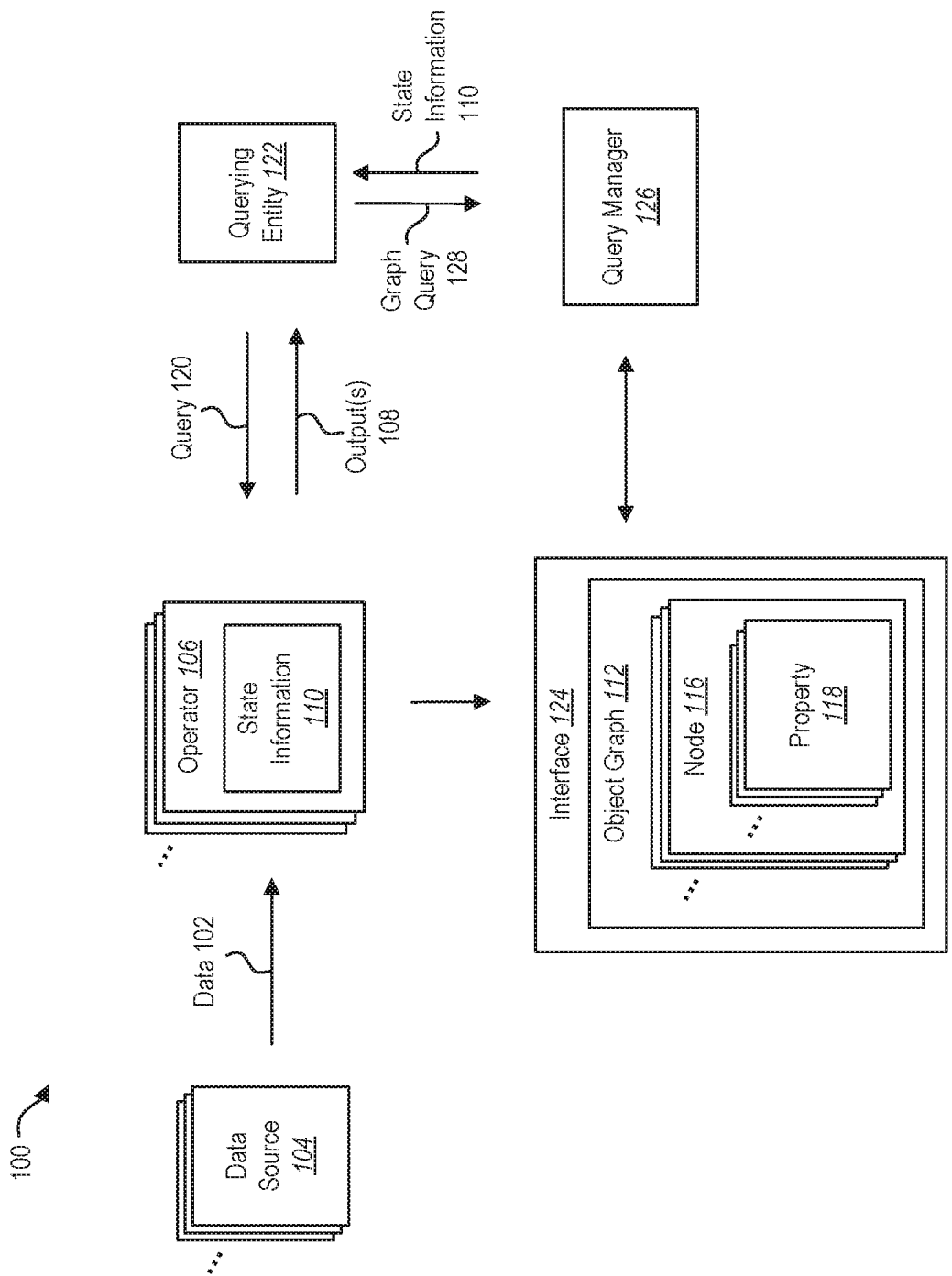
FIG. 1 illustrates an example of a data processing system in which the techniques disclosed herein may be utilized.

The present disclosure is generally related to operators in a data processing system, such as an event processing system. In this context, the term "operator" may refer to any entity in a data processing system that performs an operation on data and produces one or more outputs that can be observed by another entity. An operator may perform a computation that takes a set of one or more inputs and produces a set of one or more outputs. Some examples of operators in a data processing system include an average operator that calculates an average of a set of values, a sum operator that calculates the sum of a set of values, and an aggregation operator that combines multiple pieces of data. Of course, these particular examples should not be interpreted as limiting the scope of the present disclosure. The techniques disclosed herein are applicable to a wide variety of operators that may be utilized in a wide variety of data processing systems.

The present disclosure is generally related to state information associated with operators. In this context, the term "state information" may refer to any information that is associated with an operator but is not included in the final output(s) produced by the operator. State information may include information or values that are calculated by an operator as part of performing a computation. Referring again to the example discussed previously, state information associated with an average operator (i.e., an operator that calculates an average of a set of values) may include a sum of the set of values and a count of how many values there are.

In data processing systems, many operators are configured as "black box" operators that encapsulate the state information so that it is not accessible. Continuing with the previous example, an average operator may be configured so that the sum and the count are not accessible. The present disclosure is related to techniques for enabling "black box" operators to become "white box" operators that facilitate access to state information by interested entities.

In accordance with one aspect of the present disclosure, object graphs may be used to facilitate access to state information. In general terms, an object graph is a representation of a collection of objects. The objects may be represented as nodes (or vertices) within the object graph, which may be joined together by links (or edges). Each link may represent a relationship between objects. Nodes within the object graph may include various properties.

In accordance with the present disclosure, an object graph may be defined to represent a computation that is performed by the data processing system. In this context, the term "object graph" may refer to one or more sets of program instructions and/or data structures that have the effect of (i) defining the operators that are involved in the computation as objects, and (ii) defining relationships among the objects (e.g., links between the objects). In this context, the term "object" may refer to a structure in object-oriented programming that defines an entity (e.g., an operator, a data source) and the procedures that may be utilized to interact with that entity. In an object graph that represents a computation performed by a data processing system, the operators that perform the computation may be represented as nodes within the object graph. Relationships between the operators may be represented as links between the nodes in the object graph. The state information associated with a particular operator may be defined as a property of a node that corresponds to the operator. Alternatively, the state information may itself be represented as a node.

An object graph that represents a computation performed by a data processing system may be included as part of an interface to the data processing system, such as an application programming interface (API). For example, the program instructions and/or data structures that define the object graph may be part of an API. In other words, an interface (e.g., an API) to the data processing system may define an object graph that represents a computation, and the interface may provide access to the state information that is produced in relation to the computation via the object graph definition.

An object graph may be defined in such a way that the objects within the object graph (and the properties of those objects) are accessible via a graph query language. Some examples of graph query languages include Cypher, SPARQL, GraphQL, and Gremlin. Thus, the state information that is associated with a particular operator may be accessed via a graph query. In this context, the term "graph query" refers to a query that is structured in accordance with a graph query language. A graph query may be structured so that it returns information about one or more objects that have been defined.

A graph query may be used to access state information that is associated with a particular operator involved in a particular computation. As discussed above, an object graph may be created that represents the computation. To access the state information, the graph query may include an instruction to traverse a plurality of nodes within the object graph. For example, the graph query may include a reference to an object in the object graph that represents the computation itself. That object may be linked (either directly or via one or more other objects) to another object that includes the desired state information (e.g., as a property). The graph query may include instructions that, when processed, cause a plurality of nodes (e.g., objects) within the object graph to be traversed until the desired state information is obtained.

In this context, the term "traverse" may refer to accessing a desired node in an object graph via one or more other nodes that are linked to the desired node. Consider a simple object graph that includes three nodes: A→B→C (where A, B, and C represent nodes, and where the arrows represent links or pointers between the nodes). A query that traverses nodes A, B, and C may include a reference to each of these nodes.

Another feature of the present disclosure is the ability to navigate to a node in an object graph, select a property of that node (e.g., the Sum property in an Average operator), and create an event processing query over that node's property (e.g., create an event processing query over the Sum property). So rather than querying a single value now, or multiple values from the past (e.g., a temporal range in the past with an upper bound of the current time), this feature allows the creation of queries that return results from future events.

In other words, state information that would otherwise be an inaccessible byproduct produced by an operator is made "first class" in the event processing system, such that it becomes addressable (through graph queries) and behaves like any other stream in the event processing system. That is, byproducts of operators in event stream processing systems become first-class streams themselves. Queries over these streams can in turn use operators that have encapsulated state information that can be accessed using the techniques disclosed herein, thus again making it possible to run standing queries over them. This process can continue indefinitely, thereby significantly expanding the amount of information that can be accessed and queried.

The techniques disclosed herein for accessing state information are more efficient than current approaches. As discussed above, computations may be annotated with explicit operations related to writing state information to memory. However, this approach requires the operator state to be duplicated. The techniques disclosed herein facilitate access to state information without requiring duplication of the state information. Thus, the techniques disclosed herein reduce the memory requirements associated with accessing state information.

FIG. 1 illustrates an example of a data processing system 100 in which the techniques disclosed herein may be utilized. The data processing system 100 performs computations on data 102 that is produced by data sources 104. The system 100 includes a plurality of operators 106 that perform computations on the data 102, thereby producing outputs 108. There may be state information 110 associated with at least some of the operators 106. The state information 110 may be used to generate the output(s) 108. The output(s) 108 may be produced in response to one or more queries. FIG. 1 shows a querying entity 122 providing a query 120 to the data processing system 100 and receiving output(s) 108 from computations performed by the operators 106 in response to the query 120.

As discussed above, with currently known data processing systems it may be difficult to access the state information 110. In order to make the state information 110 accessible, the operators 106 that are involved in performing a particular computation may be represented as an object graph 112. The operators 106 that perform the computation may be represented as nodes 116 within the object graph 112. Relationships between the operators 106 may be represented as links between the nodes 116 in the object graph 112. The state information 110 associated with a particular operator 106 may be represented as one or more properties 118 of the node 116 corresponding to that operator 106 in the object graph 112.

The information in the object graph 112 (including the properties 118 of the nodes 116, which correspond to the state information 110 associated with the operators 106) may be accessed, or queried, using a graph query language. The data processing system 100 may include an interface 124 that provides access to the object graph 112. The object graph 112 may be defined as part of the interface 124. The interface 124 may be implemented as an application programming interface (API). The data processing system 100 also includes a query manager 126 that receives, processes, and responds to queries for information about the operators 106. The query manager 126 may access information about the operators 106 (including information about the object graph 112 that represents a computation performed by the operators 106) via the interface 124.

Queries for information related to the object graph 112 may be structured as graph queries that are written using a suitable graph query language. FIG. 1 shows the querying entity 122 sending a graph query 128 to the query manager 126. The graph query 128 may include an instruction to determine state information 110 associated with one or more operators 106 by accessing and traversing the object graph 112. The query manager 126 processes the graph query 128 to determine the state information 110, and returns the state information 110 to the querying entity 122.

A graph query 128 may be created with respect to a property 118 of a node 116 in an object graph 112. In other words, with current approaches, certain information provided by an operator 106 may be queried, while certain other information (e.g., state information 110) is not accessible and cannot be queried. The techniques disclosed herein enable that state information 110 to be queried via graph queries 128 that are processed in relation to an object graph 112. The state information 110 associated with a particular operator 106 can be queried as a property 118 of a node 116 corresponding to the operator 106. A graph query 128 in accordance with the present disclosure may have a temporal dimension. In other words, in addition to determining the current value of the state information 110 associated with an operator 106, a graph query 128 may also be used to determine one or more values from the past. In addition, a graph query 128 may be treated as a standing query that returns state information 110 corresponding to future events.

The state information 110 may be used for a variety of purposes. In some embodiments, the state information 110 may be used for query optimization. For example, the state information 110 that is determined in response to the graph query 128 may be used to optimize the query 120 that structures the computation performed by the operators 106. The state information 110 may indicate problems or inefficiencies with the query 120 and suggest ways that the query 120 may be restructured in order to improve performance.

FIG. 1 shows the same querying entity 122 providing the query 120 that returns output(s) 108 from a computation performed by the operators 106, and the graph query 128 that returns state information 110 that is associated with the operators 106. However, this should not be interpreted as limiting the scope of the present disclosure, as different querying entities may be involved with different types of queries.

Figure 2:
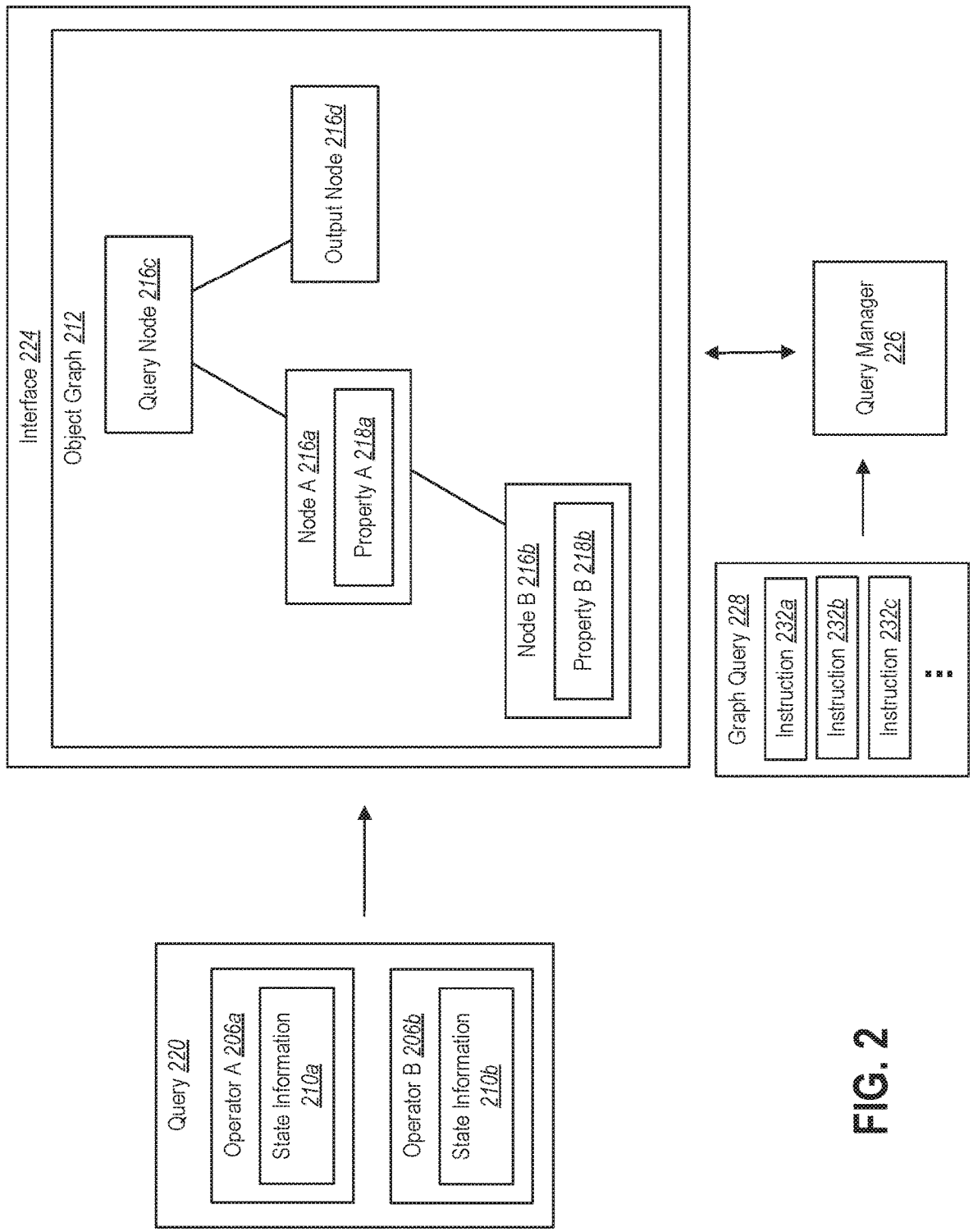
FIG. 2 illustrates an example of an object graph that may be created to represent a computation that involves a plurality of operators.

FIG. 2 illustrates an example of an object graph 212 that may be created to represent a computation that involves a plurality of operators. For the sake of simplicity and clarity, it will be assumed that there are only two operators in the depicted example. Of course, the techniques disclosed herein may be utilized in connection with computations that involve a different number of operators, including computations that involve many more than two operators.

The operators in the depicted example will be referred to as operator A 206a and operator B 206b. There is state information 210a associated with operator A 206a and state information 210b associated with operator B 206b. The state information 210a-b may be used to produce the output(s) of the computation. The computation may be performed as the result of a query 220.

In the object graph 212, operator A 206a is represented as node A 216a and operator B 206b is represented as node B 216b. The state information 210a associated with operator A 206a is represented as a property (property A 218a) of node A 216a in the object graph 212. Similarly, the state information 210b associated with operator B 206b is represented as a property (property B 218b) of node B 216b in the object graph 212. The object graph may also include a node 216c that represents the query 220, and a node 216d that represents the querying entity that receives output(s) that are produced from processing the query 220 and performing the computation. The object graph 212 includes links between the nodes that represent the interrelationships among the various nodes.

As discussed above, the object graph 212 may be accessible via an interface 224. A querying entity may submit a graph query 228 to a query manager 226 in order to access the state information 210a-b associated with the operators 206a-b. The graph query 228 may include references to nodes within the object graph and to properties of those nodes. For example, in order to access the state information 210b that is associated with operator B 206b, the graph query 228 may include a reference to the query node 216c and various instructions that cause the object graph 212 to be traversed to node B 216b. These instructions may include an instruction 232a to traverse the link between the query node 216c and node A 216a, an instruction 232b to traverse the link between node A 216a and node B 216b, and an instruction 232c to return the property (property B 218b) that is associated with node B 216b.

Several examples of computations and graph queries that may be created to gain access to state information will now be discussed. Consider a first example computation:

```
subscription = weather.Take(1 * HOUR).Average(w =>
    w.Temperature).Subscribe(print)
```

This expression is an example of a query (such as the queries 120, 220 described above) that may be created in order to cause operators in a data processing system to perform a computation. In this example, the computation subscribes to the weather stream and computes the average temperature for one hour worth of events (relative to the time the computation is started).

Figure 3A:
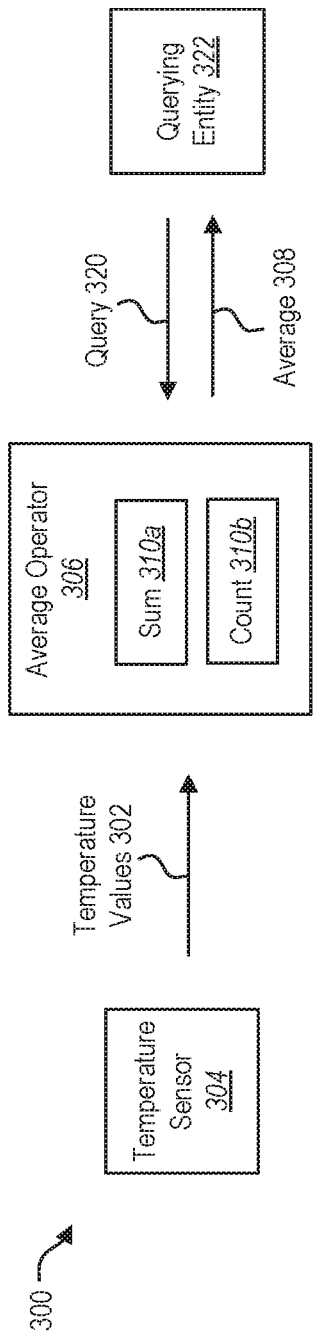
FIG. 3A illustrates an example in which a querying entity subscribes to certain information that is related to a data stream output by a temperature sensor.

FIG. 3A illustrates components within a data processing system 300 that are relevant to this example. A temperature sensor 304 outputs a data stream that includes temperature values 302. A querying entity 322 subscribes to certain information that is related to the data stream. In particular, the querying entity 322 provides a query 320 that requests an average temperature 308 that is calculated over a specified time period (an hour in this example). The Average operator 306 contains two pieces of state information: a running sum 310a and an event count 310b, both of which would be encapsulated as operator implementation details in a traditional implementation.

Figure 3B:
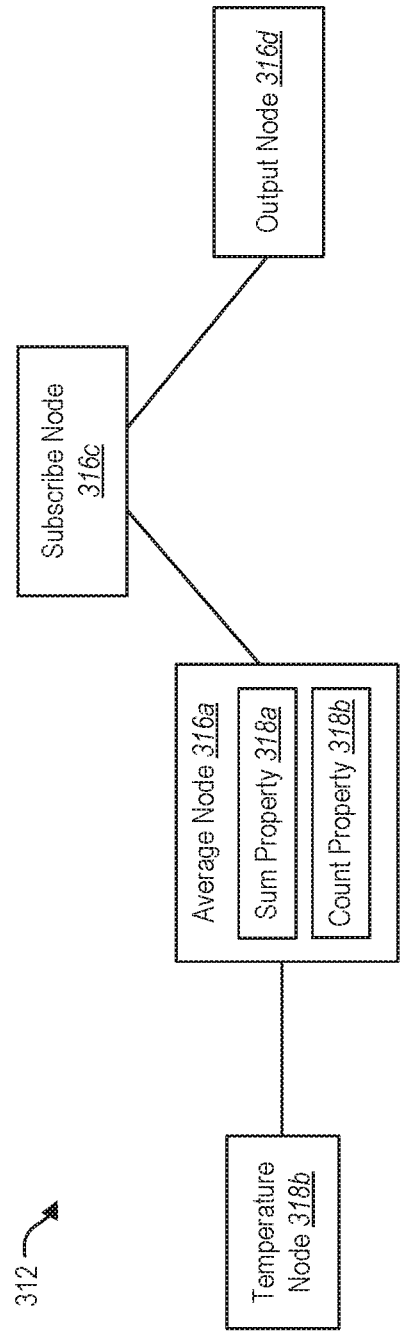
FIG. 3B illustrates an example of an object graph that represents the computation shown in FIG. 3A.

In accordance with the techniques disclosed herein, the computation corresponding to the query 320 may be represented as an object graph. FIG. 3B illustrates an example of an object graph 312 that represents the computation shown in FIG. 3A. The object graph 312 includes an average node 316a that corresponds to the average operator 306, a temperature node 318b that corresponds to the temperature sensor 304, and an output node 316d that corresponds to the querying entity 322. The object graph 312 also includes a subscribe node 316c that represents the query 320. The average node 316a includes a sum property 318a and a count property 318b corresponding to the state information (sum 310a and count 310b) maintained by the average operator 306.

The following is an example of a graph query that may be utilized to access the state information 310a-b associated with the Average operator 306:

```
subscription.State.Select(sub =>
    (Average)state.Observable).Select(avg => new { sum =
    avg.State.Sum, count = avg.State.Count })
```

In this expression, the top-level State object represents the state of the subscription, which consists of an observable side (left-hand side of Subscribe) and an observer side (right-hand side of Subscribe, i.e., print). The above graph query traverses into the Observable state, casting it to "Average" (which is a type that exposes the operator state for the Average operator), in order to retrieve both the Sum and Count values.

Graph queries over the state space could return many operator nodes. For example, a graph query could be constructed to find the state of all "Average" operators in a computation. Combined with the ability to enumerate all artifacts (similar to the catalog in a traditional database), it is also possible to create queries that span across several artifacts.

A more involved example to illustrate these traversals is shown below:

```
subscription = xs.Take(n).CombineLatest(ys,
    f).CombineLatest(zs, g).Subscribe(out)
```

Figure 4:
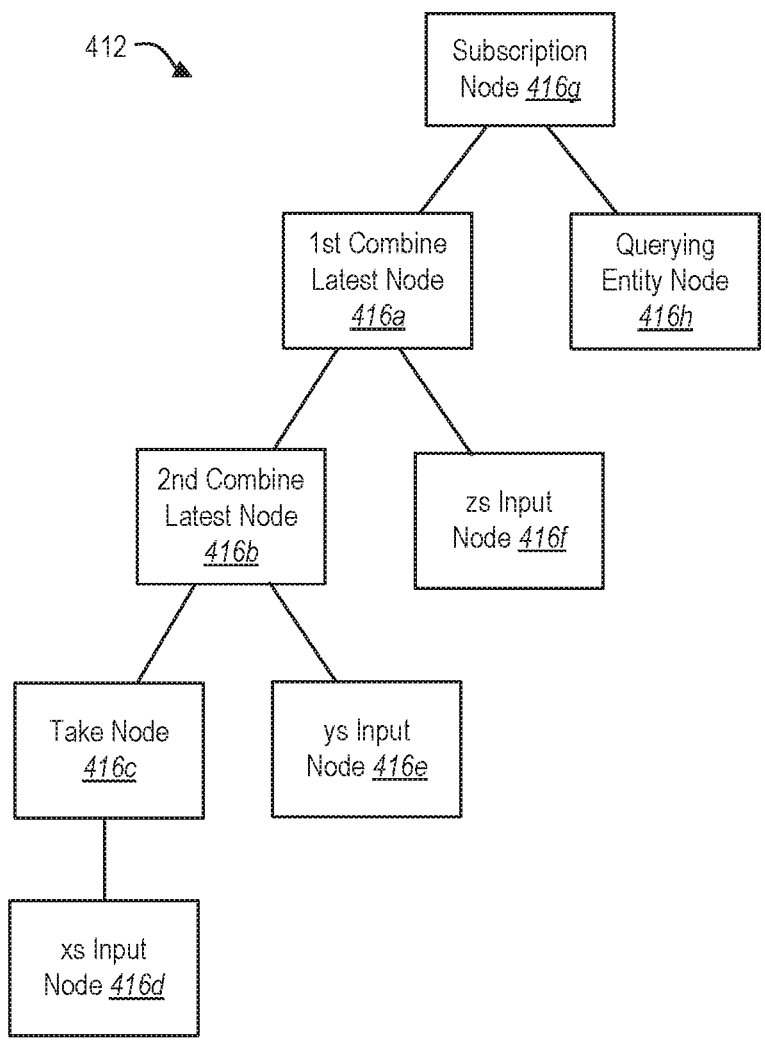
FIG. 4 illustrates an example of an object graph that represents a computation that involves the use of a Take operator, two instances of a CombineLatest operator, and three input sources.

This query expresses a computation that involves the use of a Take operator, two instances of a CombineLatest operator, and three input sources (xs, ys, and zs). FIG. 4 illustrates an example of an object graph 412 that represents the computation that is expressed in this query. The object graph 412 includes a first CombineLatest node 416a and a second CombineLatest node 416b corresponding to the two CombineLatest operators and a Take node 416c corresponding to the Take operator. The object graph 412 also includes three input nodes 416d-f corresponding to the three input sources (an input node 416d corresponding to the xs input source, an input node 416e corresponding to the ys input source, and an input node 416f corresponding to the zs input source). The object graph 412 also includes a subscription node 416g that represents the computation (or query) as a whole. In addition, the object graph 412 includes a querying entity node 416h that represents a querying entity that will receive output(s) corresponding to the computation.

To access state information that is associated with the Take operator, a graph query may be created that includes instructions to traverse the object graph 412 three levels deep. The following is an example of this type of graph query:

```
subscription.State.Select(sub =>
(CombineLatest)sub.Observable).Select(cl1 =>
(CombineLatest)cl1.Left).Select(cl2 =>
(Take)cl1.Left).Select(take => take.RemainingCount)
```

In the examples that have been discussed to this point, the object graphs of the computations have been static in the sense that the operators that are involved in the computations, and the relationships between those operators, do not change over time. In the example shown in FIG. 4, for instance, the CombineLatest and Take operators are in "fixed" positions throughout the lifetime of the query. However, the techniques disclosed herein may also be utilized in connection with dynamically changing computations. In a dynamically changing computation, the operators that are involved in the computation, and the relationships between those operators, may change over time.

The following is an example of a query that produces a dynamically changing computation:
subscription=xs.Concat(ys)

In this example, the Concat operator has a state object associated with the left side of the query (the xs input source) and a state object associated with the right side of the query (the ys input source). Either of these state objects can be set to "null" indicating the phase of the operator's execution. If the right side's state object is null, this indicates that a final event has not been received with respect to the left side's state object. If the left side's state object is null, this indicates that a final event has been received with respect to the left side's state object.

Consider another example that is similar to the previous example but that includes additional operators:
subscription=xs.Take (5).Concat(ys.Skip(3))

There are three operators in this query: Take, Skip, and Concat. FIG. 5A illustrates an example showing how this query may be implemented. In particular, FIG. 5A shows an output stream from an xs input source and an output stream from a ys input source. FIG. 5A also shows outputs produced by the Take, Skip, and Concat operators as they perform the computation that is specified by the query. In this example, the output of the Concat operator is equal to the xs input source for the first five events that are output by the xs input source. The output of the Concat operator then remains unchanged for the next three events that are output by the ys input source. The output of the Concat operator is then equal to the output of the ys input source. Thus, this computation changes dynamically in the sense that the computation involves different operators at different points in time.

FIGS. 5B and 5C illustrate an example of an object graph that represents the computation that is expressed in this query. Because the computation itself changes dynamically, the object graph that represents the computation also changes dynamically. FIG. 5B illustrates the object graph 512a before the Take operator has completed (i.e., before five events have been received from the xs input source). FIG. 5C illustrates the object graph 512b after the Take operator has completed (i.e., after five events have been received from the xs input source). At the point in time illustrated by the object graph 512a shown in FIG. 5A, the object graph 512a includes a Concat node 516a corresponding to the Concat operator, a Take node 516b corresponding to the Take operator, and an input node 516c corresponding to the xs input source. The Take node 516b and the xs input node 516c correspond to the "left" side of the query, and at this point in time the "right" side of the query is null. At the point in time illustrated by the object graph 512b shown in FIG. 5B, the object graph 512b includes the Concat node 516a, a Skip node 516d corresponding to the Skip operator, and an input node 516e corresponding to the ys input source. The Skip node 516d and the ys input node 516e correspond to the "right" side of the query, and at this point in time the "left" side of the query is null.

The previous example illustrates the temporal nature of data processing systems (e.g., event processing systems). Rather than using "null" values to detect the state of the system at a particular point in time, temporal queries may be performed instead. In the previous example, a querying entity could be interested in some state in "ys" after an OnCompleted event has been received by the left-hand side input "xs" of the Concat operator. In order to support this, the state traversal query language may be extended to support temporal querying.

Figure 6:
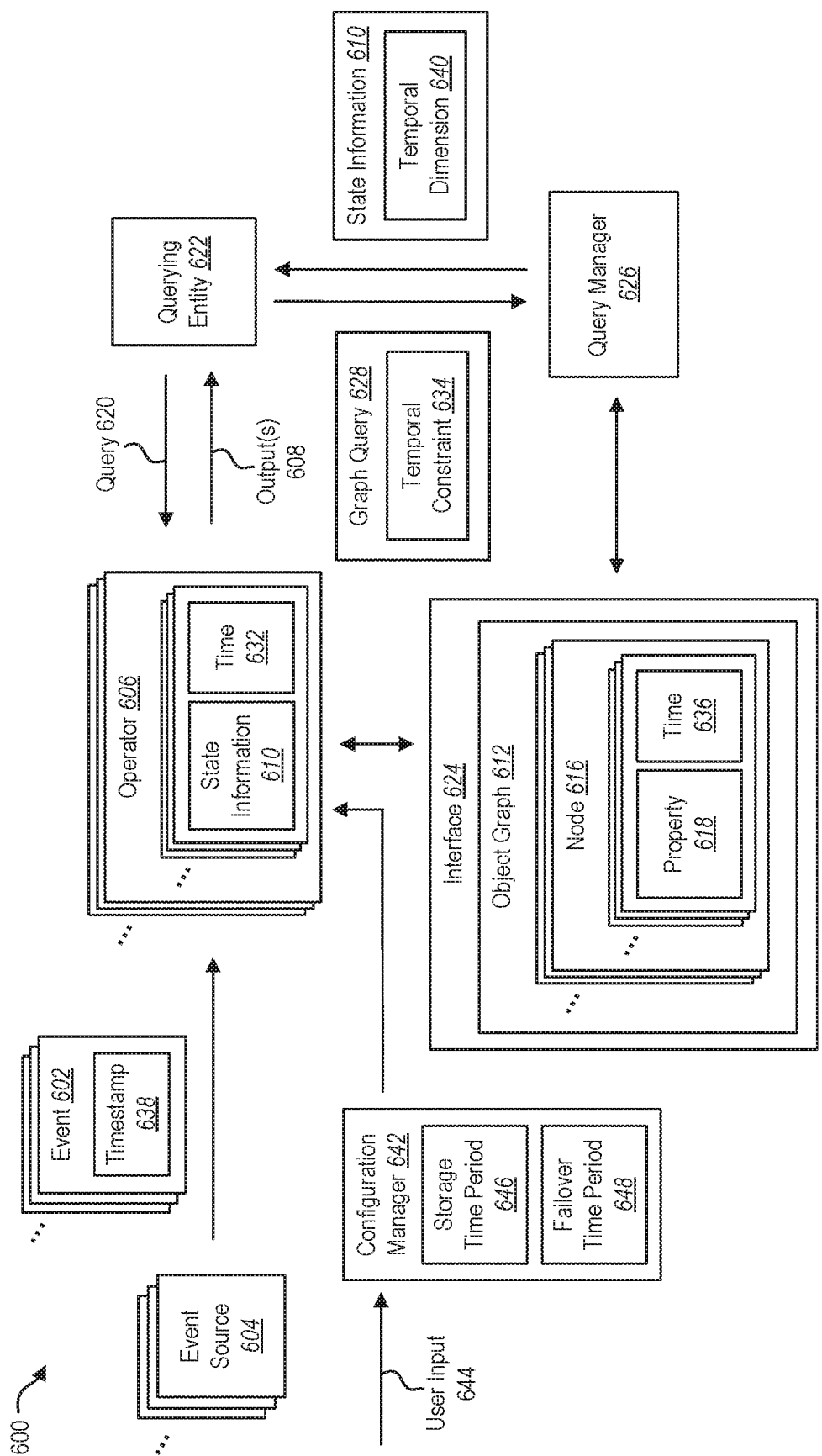
FIG. 6 illustrates an example of a data processing system that supports temporal querying.

FIG. 6 illustrates an example of a data processing system that supports temporal querying in accordance with the present disclosure. In the depicted example, the data processing system is an event processing system 600 that performs computations with respect to events 602 produced by event sources 604.

In some embodiments, there may be a logical clock that is associated with each of the inputs (event sources 604). For example, the events 602 emitted by the event sources 604 may be time series data, and each of the events 602 may be associated with a timestamp 638. Alternatively, instead of timestamps 638, the events 602 may each be associated with sequence identifiers (IDs) that are ordered sequentially, such that the sequence IDs specify the order in which the events 602 occur. The logical clocks associated with the various event sources 604 may be combined to uniquely identify a point in time at which to query for state information 610 associated with one or more operators 606.

The operators 606 that perform computations within the system may be configured to store state information 610 associated with different points in time. For example, each instance of state information 610 may be associated with a particular time 632. The time 632 associated with a particular instance of state information 610 may be derived from the timestamp(s) 638 of the event(s) 602 that produced the state information 610. An operator 606 may be configured to store some or all of the state information 610 that is computed by (or otherwise associated with) the operator 606 during a predefined time period.

In the example shown in FIG. 6, the object graph 612 that represents the computation performed by the operators 606 includes a temporal dimension as well. As before, the operators 606 that perform the computation may be represented as nodes 616 within the object graph 612. The state information 610 associated with a particular operator 606 may be represented as one or more properties 618 of the node 616. In the depicted example, however, the object graph 612 may be structured so that it represents the various instances of state information 610 stored by the operator 606. In other words, there may be a plurality of instances of a property 618 that are associated with a particular node 616, each instance of the property 618 being associated with a particular time 636.

As before, a graph query 628 may be used to determine state information 610 associated with one or more operators 606 by accessing and traversing the object graph 612. FIG. 6 shows a querying entity 622 providing a graph query 628 to a query manager 626. In the depicted example, however, the graph query 628 may include a temporal constraint 634. The temporal constraint 634 may specify a particular time and/or a particular time range for which state information 610 should be provided. The state information 610 that is provided in response to the graph query 628 may include a temporal dimension 640. In other words, the state information 610 may correspond to the temporal constraint 634 (e.g., the time and/or the time range) that is specified in the graph query 628.

By storing state information 610 for a particular time period, the event processing system 600 may be provided with characteristics of a historical database. In other words, it is not only possible to access state information 610 associated with the current time, it is also possible to access state information 610 associated with previous points in time.

The amount of state information 610 that should be stored by the operators 606 in the event processing system 600 may be configurable. The data processing system 600 is shown with a configuration manager 642. The configuration manager 642 may be responsible for specifying how much state information 610 should be stored by the operators 606 in the system 600. The amount of state information 610 to be stored may be specified via user input 644. More specifically, the user input 644 may specify a time period for storing the state information 610, and the configuration manager 642 may configure the operators 606 in the system 600 to store the state information 610 for the specified time period. As an example, if the specified time period is one minute, this means that the operators 606 store state information 610 (i.e., information about state transitions that have occurred) for the previous minute (i.e., from one minute prior to the current time up to the current time).

An event processing system 600 is typically configured to store a certain amount of state information 610 for purposes of failover. If one or more components within the event processing system 600 (e.g., host machines, virtual machines) experience failure, then this stored state information 610 may be used to recover from the failure. In some embodiments, the amount of state information 610 that is stored by the operators 606 in the system 600 may exceed the amount that is required for purposes of failover. For instance, the configuration manager 642 may define a storage time period 646 that indicates how much state information 610 should be stored by the operators 606 in the system 600. The configuration manager 642 may also define a failover time period 648 that indicates the minimum amount of state information 610 that should be stored by the operators 606 in the system 600 in the event of failover. In some embodiments, the storage time period 646 may be defined to exceed the failover time period 648.

In some embodiments, it may be possible to provide access to all of the operator state information for a particular time period without having to store all of the state information that is relevant to that time period. For example, an event processing system may be configured to periodically store system checkpoints that include all operator state information at a particular point in time. The system may also be configured to store all of the events that are received. When a query is received that requests state information for a past point in time that falls between system checkpoints, the state information may be determined using (i) the most recent system checkpoint that occurs prior to the relevant point in time, and (ii) events that have a timestamp after the system checkpoint and not later than the relevant point in time specified in the query.

Figure 7:
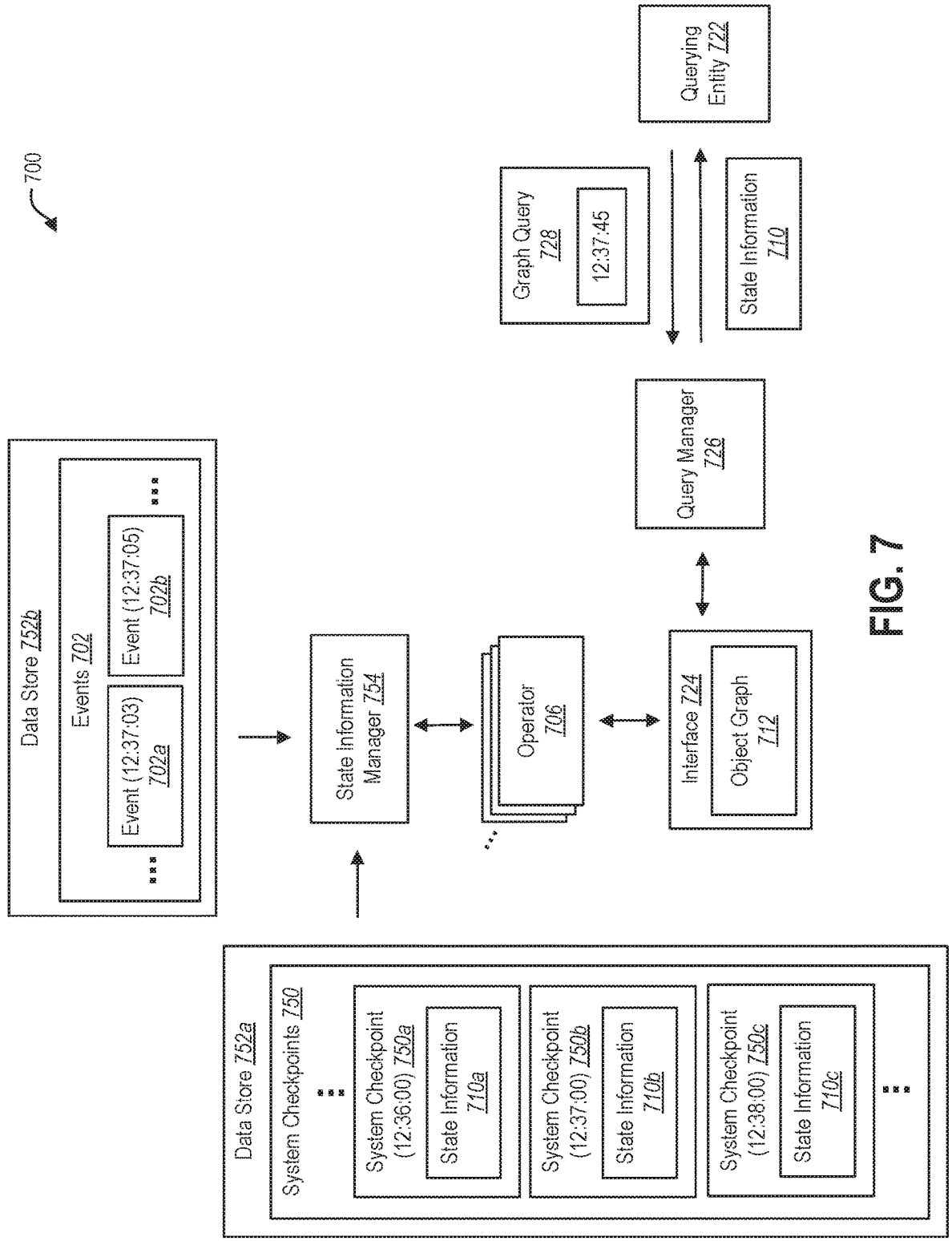
FIG. 7 illustrates an example of a data processing system that is configured to utilize stored events and periodic system checkpoints to determine state information corresponding to a past point in time.

FIG. 7 illustrates an example of a data processing system 700 that is configured in this way. In the depicted example, it will be assumed that the system 700 is configured to store system checkpoints 750 once per minute. The system checkpoint 750 that is stored at a particular time includes all of the state information associated with operators 706 in the system 700 at that point in time. FIG. 7 shows a system checkpoint 750a at 12:36:00, another system checkpoint 750b at 12:37:00, and another system checkpoint 750c at 12:38:00. The system checkpoints 750a-c include state information 710a-c corresponding to the times at which the checkpoints 750a-c were created (e.g., the system checkpoint 750a at 12:36:00 includes the state information 710a at 12:36:00).

Suppose that a graph query 728 is received requesting state information 710 associated with a particular point in time that occurs in the past. In this example, it will be assumed that the graph query 728 requests state information 710 for the time 12:37:45. In the depicted example, there is not a system checkpoint that corresponds to this particular point in time. To provide the state information 710 corresponding to the requested time, the system 700 may select the most relevant system checkpoint and then replay events from an event store 754 to fill in any missing gaps. The system 700 is shown with a state information manager 754 for providing this functionality. When events 702 are replayed, they may be processed by the operators 706 in the system 700 in the order in which they occurred, based on the timestamps or sequence IDs that are associated with the events 702.

More specifically, the state information manager 754 may begin with the most recent system checkpoint that occurs prior to the relevant point in time, which in the depicted example is the system checkpoint 750b at 12:37:00. The state information manager 754 may then replay any events that have a timestamp that is later than the relevant system checkpoint and not later than the time specified in the query 728. In the depicted example, this includes an event 702a with a timestamp of 12:37:03, an event 702b with a timestamp of 12:37:05, and so forth. The operators 706 may recreate the state information 710 for the time specified in the query 728 using both the system checkpoint 750b and the relevant events 702. The query manager 726 may provide this state information 710 to the querying entity 722.

The system 700 may include a data store for storing system checkpoints 750 and events 702. FIG. 7 shows two data stores 752a-b, including a data store 752a for storing system checkpoints 750 and another data store 752b for storing events 702. In alternative embodiments, the system checkpoints 750 and the events 702 may be stored within the same data store.

Several examples of graph queries that include a temporal dimension will now be discussed. Consider again the following example, which was discussed previously:

subscription=xs.Concat(ys)

Assume that "xs" received an "OnCompleted" event at time t0, causing the "Concat" operator to subscribe to the right-hand side input "ys". A query manager may be configured to traverse the temporal axis to time "t0" and subsequently run the state traversal query. To achieve this, the "State" property on the subscription used in the prior examples may be considered to be a shorthand for "subscription[time: null].State", where there is an index into the temporal space established by the subscription at the current time (represented using a sentinel value "null"). To navigate to a point in time, a logical clock may be constructed spanning all inputs to the computation, and this logical clock may be passed to the indexer instead. For example:

subscription[new Clock{{xs, t0}}].State

This expression causes the query manager to navigate to a point in time where "xs" has received an event at time "t0" according to its logical clock (e.g., an "OnCompleted" event), and where "ys" is left unspecified, causing the query manager to navigate to the first state in the system where "xs" has advanced beyond "t0". If a querying entity is interested in the state of the computation at a time where "ys" has made progress as well (for example having received an event at time "t2"), more clock constraints can be specified:

```
subscription[new Clock { { xs, t0 }, { ys, t2 }
}].State
```

The example discussed above can be extended as follows:
xs.Concat(ys).Average( )

The following is an example of a graph query that obtains the state of the Average operator at the specified time:

```
subscription[new Clock { { xs, t0 }, { ys, t2 }
}].State.Select(sub => (Average)sub.Observable).Select(avg
=> new { sum = avg.State.Sum, count = avg.State.Count })
```

Additional constructs may be supported to navigate in the temporal space. Rather than specifying a point in time (as done above), two clock values can be specified to establish an inclusive range. The result is a sequence of states within the specified time range:

```
subscription[new Clock { { xs, t0 }, { ys, t2 } },
new Clock { { xs, t0 }, { ys, t4 } }].States.SelectMany(sub
=> ...)
```

In this expression, each value of "sub" represents a temporal snapshot of the subscription state at times that fall between the specified clock values. Note that "sub" also exposes a property called "Time" that reflects the clock value associated with the temporal snapshot. In fact, clocks themselves have a query language which can be used to reformulate the same query as follows:

```
new Clock { ... }.Until(new Clock { ...
}).SelectMany(time => subscription[time].State.Select (sub =>
...))
```

Temporal queries at the current point in time simply query actual runtime state. Temporal queries that navigate to the past can check whether the state being queried has not advanced beyond the requested point in time, and return the current value if that is the case. If progress has been made, the first checkpoint (subject to retention policies of checkpoints besides the most recent one) before the requested time can be restored into a passive copy of the computation and inputs can be replayed (subject to retention policies of inputs to the computation, e.g., in an ingress system) to advance the clock to the requested time. Temporal queries that request state at a future point in time act as breakpoints that are connected to the clock manager associated with the computation; after processing an input event that moves the logical clock to the requested time or beyond, the requested state may be captured and returned to the query. Note that the latter case is effectively a standing computation by itself, in effect subscribing to the event stream of logical clock values (the system "timer") and performing a state query when the timer fires.

In the examples discussed herein, the references to "xs" and "ys" uniquely identify the respective sources. Alternatively, objects that represent proxies to such sources may be used instead. The objects may be uniquely identified using an identifier (akin to the name of a table in a database system).

Figure 8:
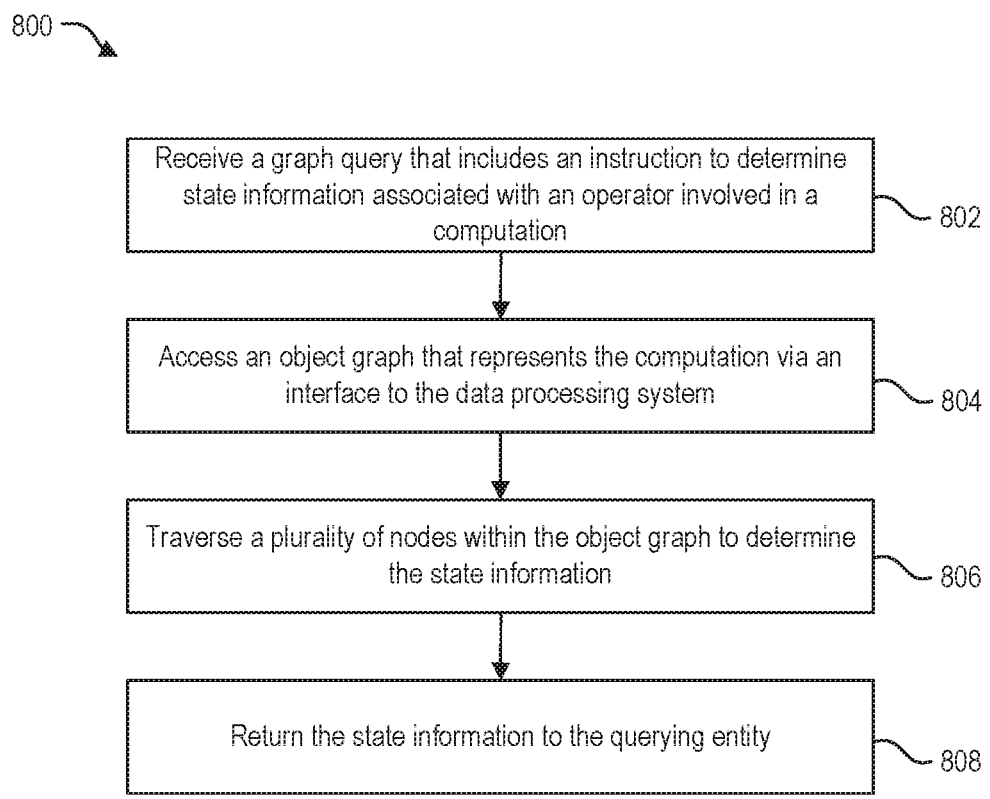
FIG. 8 illustrates a method for providing access to state information associated with an operator within a data processing system.

FIG. 8 illustrates a method 800 for providing access to state information 110 associated with an operator 106 within a data processing system 100. The method 800 will be described in relation to the data processing system 100 that was described previously in connection with FIG. 1. The method 800 may be performed by the query manager 126 in the data processing system 100.

Step 802 of the method 800 includes receiving a query, such as a graph query 128, that includes an instruction to determine state information 110 associated with an operator 106. The operator 106 may be involved in a computation that is performed by the data processing system 100. The query may be received from a querying entity 122.

Step 804 of the method 800 includes accessing an object graph 112 that represents the computation that includes the operator 106. The query manager 126 may access the object graph 112 via an interface 124 that is defined for the data processing system 100.

Step 806 of the method 800 includes traversing a plurality of nodes within the object graph 112 in order to determine the state information 110. Several examples were described previously that illustrate how a plurality of nodes may be traversed in order to determine state information 110. For instance, the example shown in FIG. 2 involves traversing several nodes (a query node 216c, node A 216a, and node B 216b) in order to determine state information 110 (which, in the example shown in FIG. 2, is represented as a property 218b of node B 216b).

Step 808 of the method 800 includes returning the state information 110 to the querying entity 122. Providing the state information 110 in this way may save the data processing system 100 from having to perform another computation (using the same set of operators 106 or a different set of operators 106) to determine the state information 110.

Figure 9:
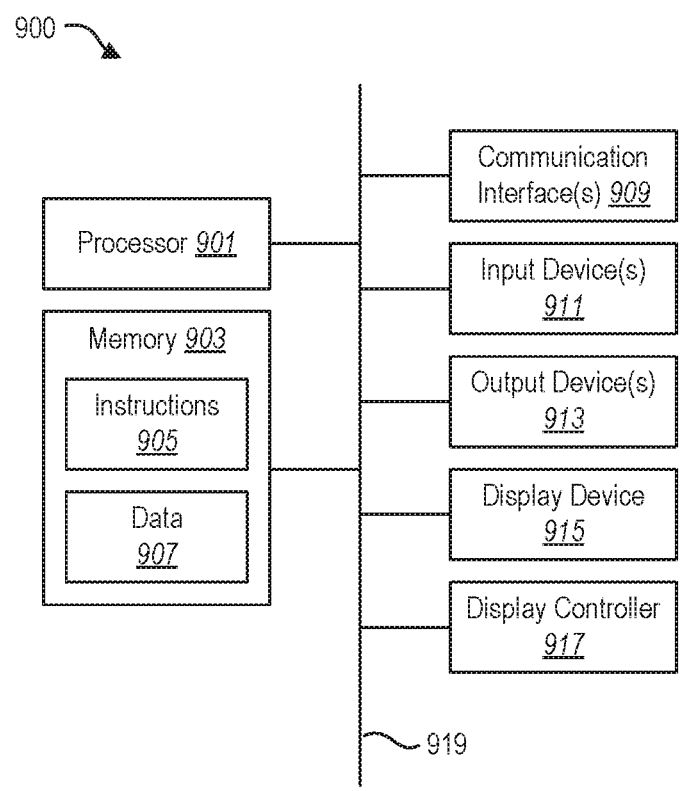
FIG. 9 illustrates certain components that may be included within a computing system that may be utilized by a data processing system and/or a querying entity in accordance with the present disclosure.

Some aspects of the present disclosure may be implemented by a data processing system. Other aspects of the present disclosure may be implemented by an entity that queries a data processing system. FIG. 9 illustrates certain components that may be included within a computing system 900 that may be utilized by a data processing system and/or a querying entity in accordance with the present disclosure.

The computing system 900 includes a processor 901. The processor 901 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computing system 900 of FIG. 9, in an alternative configuration, a combination of processors (e.g., an ARM and DSP) could be used.

The computing system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor 901, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the methods, steps, operations, actions, or other functionality that is disclosed herein. Executing the instructions 905 may involve the use of the data 907 that is stored in the memory 903. Unless otherwise specified, any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

The computing system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing system 900 may also include one or more input devices 911 and one or more output devices 913. Some examples of input devices 911 include a keyboard, mouse, microphone, remote control device, button, joystick, trackball, touchpad, and lightpen. One specific type of output device 913 that is typically included in a computing system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915. The computing system 900 may also include other types of output devices 913, such as a speaker, a printer, etc.

The various components of the computing system 900 may be coupled together by one or more buses, which may include a power bus, a control signal bus, a status signal bus, a data bus, etc. For the sake of clarity, the various buses are illustrated in FIG. 9 as a bus system 919.

In some embodiments, the techniques disclosed herein may be implemented via a distributed computing system. A distributed computing system is a type of computing system whose components are located on multiple computing devices. For example, a distributed computing system may include a plurality of distinct processing, memory, storage, and communication components that are connected by one or more communication networks. The various components of a distributed computing system may communicate with one another in order to coordinate their actions.

In some embodiments, the techniques disclosed herein may be implemented via a cloud computing system. Broadly speaking, cloud computing is the delivery of computing services (e.g., servers, storage, databases, networking, software, analytics) over the Internet. Cloud computing systems are built using principles of distributed systems.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A data processing system that is configured to provide access to operator state information, comprising:
   one or more processors;
   a plurality of operators each executable by the one or more processors to perform a computation with respect to data received from data sources, wherein the computation produces at least one output, wherein an operator of the plurality of operators comprises state information based on the data received, and wherein the state information is internal to the operator and not provided as an output;
   an object graph interface that provides access to an object graph comprising a plurality of nodes that symbolically represent the plurality of operators, wherein the object graph is a separate data structure from the plurality of operators, wherein a node of the plurality of nodes corresponds to the operator and includes one or more properties storing a copy of the state information of the operator, and wherein the object graph interface provides access to the one or more properties of the node via a graph query of the object graph; and
   a query manager that is executable by the one or more processors to process the graph query to retrieve the state information from the one or more properties of the node via the object graph interface.

2. The data processing system of claim 1, wherein:
   the object graph interface provides indirect access to the state information via the object graph;
   the data processing system comprises an event processing system; and
   the computation is performed with respect to events produced by a plurality of event sources, each event being associated with a timestamp.

3. The data processing system of claim 1, wherein:
   the plurality of operators are configured to internally store a plurality of state information for a plurality of different points in time;
   the plurality of state information in inaccessible by querying the plurality of operators;
   the graph query specifies a temporal constraint; and
   the state information comprises a temporal dimension.

4. The data processing system of claim 1, wherein:
   the computation changes dynamically such that the computation involves a first set of one or more operators at a first point in time and a second set of one or more operators at a second point in time; and
   the object graph also changes dynamically such that the object graph comprises a first set of one or more nodes corresponding to the first set of one or more operators at the first point in time and a second set of one or more nodes corresponding to the second set of one or more operators at the second point in time.

5. The data processing system of claim 1, wherein the graph query comprises a reference to a previous point in time, and further comprising:
   a data store;
   a plurality of system checkpoints stored in the data store;
   events stored in the data store; and
   a state information manager that is executable by the one or more processors to determine the state information corresponding to the previous point in time using a system checkpoint and subsequent events that have a timestamp after the system checkpoint and not later than the previous point in time specified by the graph query.

6. The data processing system of claim 1, further comprising a configuration manager that configures the plurality of operators to internally store the state information for a time period that exceeds a defined failover time period.

7. The data processing system of claim 1, wherein the object graph interface provides indirect access to the state information via graph queries processed in relation to the object graph.

8. A method for providing access to hidden state information associated with operators within a data processing system, comprising:
   generating output utilizing an operator of the data processing system based on an input and state information, wherein the state information is not included in the output;
   receiving, from a querying entity, a graph query to determine the state information associated with an operator, wherein the state information is not available via querying the operator;
   accessing an object graph via an object graph interface that provides access to node properties via graph queries processed in relation to the object graph, wherein the object graph represents a computation performed by a plurality of operators comprising the operator;
   traversing a plurality of nodes within the object graph to identify a node that corresponds to the operator, wherein the plurality of nodes in the object graph represent the plurality of operators;
   determining, via the object graph interface, the state information associated with the operator by identifying one or more properties of the node that corresponds to the state information from the operator; and
   providing the state information from the object graph in response to the querying entity.

9. The method of claim 8, wherein:
   the data processing system comprises an event processing system; and
   the computation is performed with respect to events produced by at least one event source, each event being associated with a timestamp.

10. The method of claim 9, further comprising:
    navigating to the node within the object graph;
    selecting a property of the node of the one or more properties; and
    creating an event processing query with respect to the property of the node.

11. The method of claim 8, wherein:
    the computation changes dynamically such that the computation involves a first set of one or more operators at a first point in time and a second set of one or more operators at a second point in time; and
    the object graph also changes dynamically such that the object graph comprises a first set of one or more nodes corresponding to the first set of one or more operators at the first point in time and a second set of one or more nodes corresponding to the second set of one or more operators at the second point in time.

12. The method of claim 8, wherein:
    the operator internally stores the state information for a plurality of different points in time;
    the graph query specifies a temporal constraint; and
    the state information comprises a temporal dimension.

13. The method of claim 8, further comprising:
    receiving user input that specifies a time period for storing the state information; and
    modifying the operator to maintain the state information for a duration of the time period.

14. The method of claim 8, further comprising modifying the operator to maintain the state information for a time period that exceeds a defined failover time period.

15. The method of claim 8, further comprising:
storing events and storing a system checkpoint that comprises the state information at a first point in time;
receiving a graph query that requests the state information at a second point in time that occurs after the first point in time; and
accessing the system checkpoint and replaying the events that have timestamps that are after the first point in time but not later than the second point in time.

16. The method of claim 8, wherein:
generating the output utilizing the operator is performed in response to a query; and
the method further comprises using the state information to optimize an additional query.

17. A method for accessing hidden state information from operators within a data processing system, comprising:
generating, utilizing an operator of the data processing system, an output based on an input and state information, wherein the state information is internal to the operator and not provided as output;
providing, to the data processing system, a graph query comprising a request to determine the state information from the operator;
traversing a plurality of nodes in an object graph to identify a node of the plurality of nodes that corresponds to the operator, wherein the node is a separate data structure from the operator, wherein the object graph comprises the plurality of nodes to symbolically represents a plurality of operators that each perform a computation;
identifying a property of the node comprising a copy of the state information; and
receiving, from the data processing system, the state information obtained from the property of the node that is separate from the operator.

18. The method of claim 17, wherein:
the data processing system comprises an event processing system; and
the computation is performed with respect to events produced by at least one event source, each event being associated with a timestamp.

19. The method of claim 17, wherein the object graph dynamically updates the plurality of nodes as the plurality of operators changes.

* * * * *